United States Patent [19]
Cochrane

[11] 3,848,619
[45] Nov. 19, 1974

[54] IMPROVEMENTS IN PRESSURE-RESPONSIVE HYDRAULIC CONTROL VALVE ASSEMBLIES

[75] Inventor: Robin Adam Cochrane, Haseley Knob, England

[73] Assignee: Girling Limited, Birmingham, England

[22] Filed: June 8, 1973

[21] Appl. No.: 368,016

Related U.S. Application Data
[62] Division of Ser. No. 275,352, July 26, 1972.

[30] Foreign Application Priority Data
July 31, 1971 Great Britain.................. 36100/71

[52] U.S. Cl............... 137/116, 137/614.2, 251/63.5
[51] Int. Cl.......................................... F16k 31/363
[58] Field of Search ........ 137/116, 542, 613, 614.2; 251/63.5

[56] References Cited
UNITED STATES PATENTS

| | | | |
|---|---|---|---|
| 2,406,899 | 9/1946 | Pugh et al............................ | 137/116 |
| 2,621,598 | 12/1952 | Jerome ........................... | 137/116 X |
| 2,650,605 | 9/1953 | Mackie ............................ | 137/116 X |
| 2,696,828 | 12/1954 | Husing............................... | 137/116 |
| 3,444,888 | 5/1969 | Madden............................... | 137/542 |

*Primary Examiner*—William R. Cline
*Attorney, Agent, or Firm*—Scrivener Parker Scrivener and Clarke

[57] ABSTRACT

In a pressure-responsive hydraulic control valve assembly means are provided for adjusting the force for closing the valve in opposition to opening pressure.

5 Claims, 3 Drawing Figures

IMPROVEMENTS IN PRESSURE-RESPONSIVE HYDRAULIC CONTROL VALVE ASSEMBLIES

This is a division of application Ser. No. 275,352 filed July 26, 1972.

This invention relates to a new or improved hydraulic control valve assembly for hydraulic systems of the kind comprising a housing having an inlet for hydraulic fluid under pressure and a valve for controlling communication between the inlet and an outlet.

In one known hydraulic control valve assembly of the kind set forth the valve for controlling communication between the inlet and the outlet comprises a valve member in the form of a hardened steel ball which is adapted to be urged into engagement with a seating of complementary coned outline to ensure an effective engagement between the ball and the seating. The production of the hardened steel ball and the coned valve seating require special manufacturing operations which, in turn, increases the cost of the valve assembly.

According to one aspect of our invention in an hydraulic control valve assembly of the kind set forth for an hydraulic system the valve for controlling communication between the inlet and the outlet comprises a head, means for urging the head into engagement with a seating which surrounds passage means communicating with the inlet, and a stem carrying the head and projecting through a central opening in an abutment member communicating with the outlet.

Preferably, the head is urged into engagement with the seating by means of a spring acting between the head and the abutment member.

Our valve head and stem can be produced cheaply and without difficult and the head and the seating can both be of planar outline. The projection of the stem through the opening in the abutment member acts as a guide to restrict radial movement of the head and, as a consequence, to maintain the head and the seating substantially concentric with respect to each other.

Preferably, the free end of the stem remote from the head is provided with an enlargement of a diameter slightly greater than that of the opening through which it projects, and the abutment member is constructed from a resilient material which deforms to permit the enlargement to pass through the opening but which prevents subsequent accidental separation of the head, stem, abutment member and spring which define a sub-assembly.

The valve assembly may also include in addition to the first valve, a second valve for controlling communication between the inlet and a second outlet in the housing and, preferably, means are incorporated for controlling the differential pressure acting across each valve constructed and arranged such that each valve is adapted to close when the pressure differential across that valve attains a predetermined value.

Furthermore, in hydraulic control valve assemblies of the kind set forth the force required to open the valve is greater than, and is thus dependent upon, the loading in compression spring which it must overcome. In known hydraulic control valve assemblies the spring loading is maintained at a constant value and thus the valve opens only when subjected to a force of one magnitude.

According to another aspect of our invention in an hydraulic control valve assembly of the kind set forth means are incorporated for altering spring loading applied to a valve member whereby the opening force generated by fluid pressure can be adjusted.

Thus, by altering the spring loading, the valve can be set to open automatically at any desired fluid pressure.

Conveniently, the valve member has an axial extension, and the spring engages at opposite ends between a pair of spaced abutments of which one is mounted on the extension and the other is located in a fixed position relative to the end of the extension remote from the valve member, the extension and the said one abutment being movable with respect to each other to alter the loading of the spring which acts on the valve member in a closing direction.

Preferably the extension is screw-threaded and the said one abutment comprises a nut screwed onto the extension.

The opening force is applied to the valve member by a piston working in a bore in the housing and of which the end remote from the valve member is exposed to the fluid pressure.

The piston may be of plain cylindrical outline or it may comprise a differential piston working in a stepped bore of which the end of greater area is exposed to the fluid pressure.

One embodiment of our invention is illustrated in the accompanying drawings in which.

Figure 1:
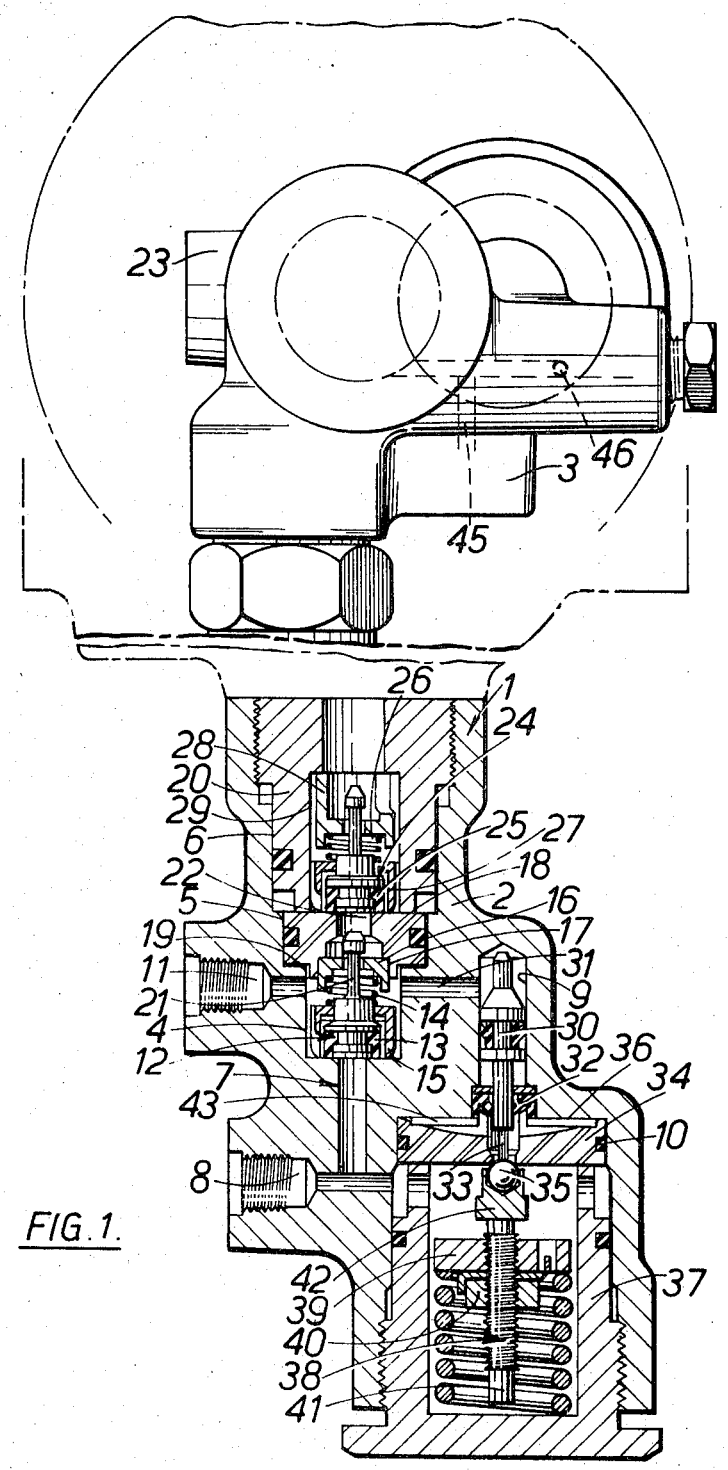
FIG. 1 is a view of an hydraulic flow control valve assembly for a vehicle hydraulic system including a longitudinal section through a portion of the valve assembly.
Figure 2:
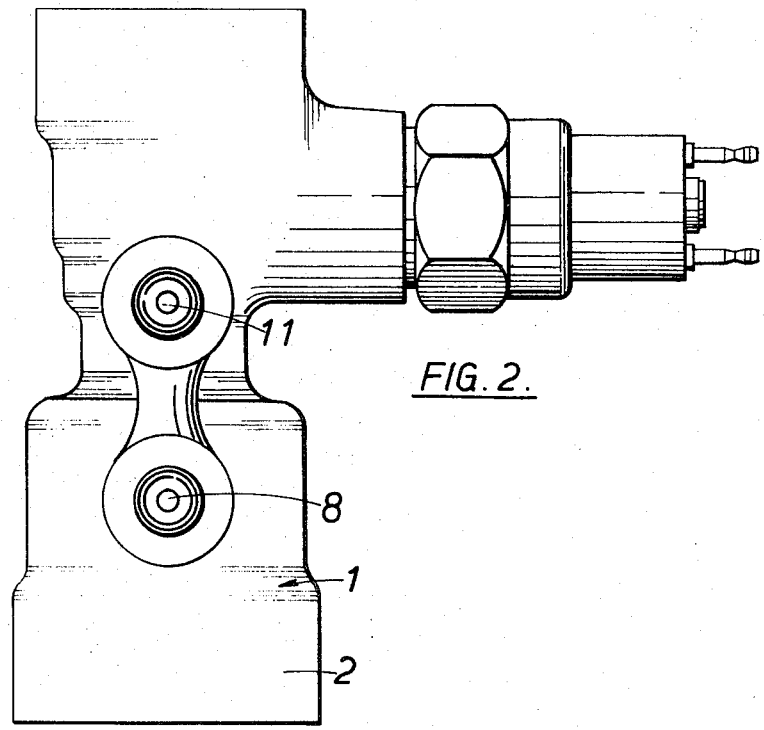
FIG. 2 is an elevation of one side of the portion of the valve assembly shown in section in FIG. 1.
Figure 3:
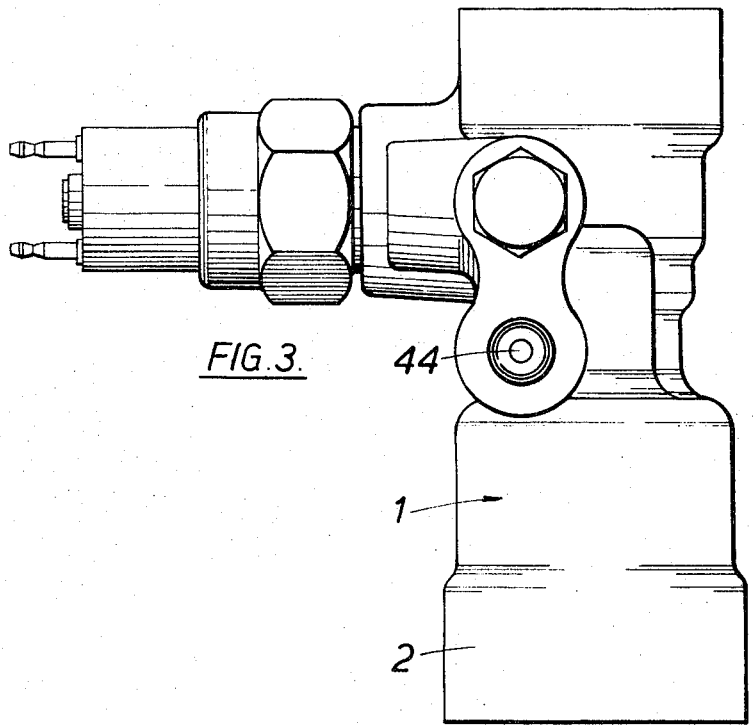
FIG. 3 is an elevation corresponding to FIG. 2 but showing the opposite side of that portion of the valve assembly.

The hydraulic control valve assembly illustrated in the drawings is suitable for incorporation in a vehicle hydraulic system, conveniently a braking or clutch system, either of which may include means for supplying hydraulic fluid under pressure to ancillary equipment, for example suspension struts of the vehicle, or an hydraulic power-operated steering mechanism.

The hydraulic control valve assembly 1 comprises a first housing part 2 and a second housing part 3.

The housing part 2 is provided with a first longitudinally extending bore 4 which is counterbored at 5, and again at 6. An axial passage 7 leading from the closed inner end of the bore 4 communicates with a radial inlet port 8 for connection to a source of hydraulic fluid under pressure, for example a high pressure pump, or an hydraulic accumulator supplied by such a pump.

The housing part 2 is also provided with a second longitudinal bore 9 which is parallel with and extends in the opposite direction with respect to the bore 4. The second longitudinal bore 9 is counterbored at 10 and the counterbore 10 communicates with the inner end of the inlet passage 8.

Communication between the inlet passage 8 and a first radial outlet 11 in the housing part 2 for connection to an hydraulic accumulator is controlled by a first one-way valve 12. The first one-way valve 12 comprises a head 13 adapted to be urged into engagement with a seating at the base of the bore 4 by means of a spring 14. The spring 14 acts between a shroud 15 surrounding the head 13 and an annular abutment member 16 of synthetic plastics material. The abutment member 16 is housed in a counterbored recess 17 in an annular seating member 18 which is clamped against a shoulder 19 at the step in diameter between the bore 4 and the counterbore 5 by means of a spigot portion 20 at the inner end of the housing part 3 which extends into the counterbore 6. The head 13 is carried by a headed stem 21 which is provided at its free end with an enlargement and which projects through a central clearance opening in the abutment member 16 and into a central opening 22 in the seating member 18. The enlargement is of a diameter slightly greater than that of the opening in the abutment member 16 and is forced through the opening in the abutment member 16 by deformation of the material due to its resilience. This prevents accidental separation of a sub-assembly comprising the head, the stem, the spring and the abutment member.

Communication between the inlet passage 8 and a second outlet passage 23 in the housing part 3 for connection to a second hydraulic accumulator is controlled by a second one-way valve 24 identical in construction to the one-way valve 12. Particularly the second one-way valve 24 comprises a head 25 for engagement with a seating surrounding the opening 22 in the seating member 18. The head 25 is urged into engagement with the seating by a compression spring 26 acting between a shroud 27 surrounding the head 25, and an axial abutment member 28 of synthetic plastics material engaging with the inner end of a shoulder at a counterbore 29 in the spigot portion 20 in which the second one-way valve 24 is housed.

A piston 30 working in the bore 9 is exposed at its inner end to the pressure at at least the first outlet 11 through a transverse passage 31. The piston 30 works through a seal 32 and its outer end is reduced in diameter at 33 to act as a push-rod extending through a valve seating member 34 to engage with a valve member in the form of a ball 35. The seating member 34 is clamped against a shoulder 36 at the step in the change in diameter between the bore 9 and the counterbore 10 by means of a plug 37 which is screwed into the outer end of the counterbore 10.

Normally the ball 35 is urged into engagement with its seating by means of sub-assembly 38 loaded by a compression spring which acts between the ball and the closed outer end of the plug 37. The effective spring loading of the sub-assembly is adjustable by rotation of a nut 39 and a locking nut 40 with respect to a threaded stem 41 having at its innermost end a recessed head 42 in which the ball 35 is received. The nut 39 and the closed end of the plug form abutments for opposite ends of the compression spring.

A chamber 43 is defined between the seating member 34 and the shoulder 36 is in communication with a third radial outlet passage 44 for connection to a reservoir for hydraulic fluid.

The piston 30 may comprise a cylindrical plain piston. Alternatively, as illustrated, the piston 30 is of differential outline working in a stepped bore defined by the bore 9 which is of greater diameter, and the central opening of the seal 32 which is of smaller diameter. In that case the end of the piston which is of greater area is subjected to pressure at the inlet when the ball 35 is held away from its seating in the seating member 34.

The housing part 3 is provided with a passage 46 providing communication between the second outlet 23 and a radial port 45 for connection to an actuator, for example for operating a brake or a clutch.

Normally the ball 35, defining the third one-way valve, is closed by the loading of the sub-assembly 38. Pressure at the inlet passage 8 is supplied to the counterbore 10 and also acts to open the first one-way valve 12 so that the inlet passage 8 is placed in communication with the first outlet 11. That pressure acts on the inner end of the piston 30 and also acts to open the second one-way valve 24 so that fluid under pressure is also supplied to the second outlet 23 and to the port 45. When the pressures at the outlets 11 and 23 attain predetermined values, the first and second valves close automatically. The individual pressures at the outlets 11 and 23 are normally arranged to equal each other. This is due to the force applied to the piston 30 which is equal to the pressure at the first outlet, acting over the inner end of greater diameter which is sufficient to advance the piston 30 and move the ball 35 away from its seating. Thus the inlet passage 8 is placed in communication with the reservoir through the seating member 34 and the third outlet 44 to relieve the pressure acting to open the one-way valves 12 and 24.

The valve assembly remains in this condition until the pressure at either or both of the outlets 11 or 23 drops below its predetermined value.

Assuming that the pressure at the first outlet 11 is reduced, the ball 35 engages with its seating under the influence of the loading of the sub-assembly 38 which is then sufficient to overcome the reduced force applied to the ball 35 by the reduced pressure in the passage 31 acting on the inner end of the piston 30. Since the inlet pressure is then higher than the pressure at the first outlet 11, the first one-way valve 12 opens due to this pressure differential. Thus the pressure at the outlet 11 is increased to its predetermined valve whereafter the first one-way valve 12 again closes automatically and the sequence described above is repeated.

Should the pressure at the second outlet be reduced, the second one-way valve 24 will open in response to the differential between the pressure applied to the two outlets 11 and 23. The two outlets 11 and 23 are then placed in communication with the result that the pressures equalise, thereby reducing the pressures applied to the outlet 11. This results in the ball 35 closing and the first one-way valve 12 opening as described above.

In the embodiment described above we have referred to the first and second outlets being connected to first and second hydraulic accumulators. It is to be understood that the outlets may be connected to other pressure responsive means, for example reservoirs for strong hydraulic pressure for an hydraulic self-levelling suspension system of the vehicle, or to separate parts of such a system.

I claim:

1. An hydraulic control valve assembly comprising a housing having an inlet, an outlet, a bore communicating with said outlet, and a counterbored recess extending from said bore and communicating with said inlet, an abutment shoulder between said bore and said counterbore, a valve for controlling communication between said inlet and said outlet and comprising a valve member, a stem carrying said valve member, a spring abutment adjustably mounted on said stem, a seating member, a hollow non-adjustable closure member sealingly located within said recess to close said recess and to clamp said seating member against said abutment shoulder, and a compression spring for urging said valve member into engagement with said seating member acting between said closure member and said spring abutment, a piston working in said bore and responsive to fluid pressure in said outlet, and a portion of said piston acting on said valve member through said seating member, said valve member being movable away from said seating member when an opening force generated by said fluid pressure acting on said piston exceeds a predetermined value, and adjustment of said spring abutment with respect to said stem alters the loading of said compression spring whereby said opening force generated by said fluid pressure can be adjusted.

2. An hydraulic control valve assembly as claimed in claim 1, wherein said stem is screw-threaded and the said one abutment comprises a nut screwed onto said stem.

3. An hydraulic control valve assembly as claimed in claim 1, wherein said piston is of differential outline working in said bore which is stepped, and the end of said piston which is of greater area is exposed to the fluid pressure.

4. An hydraulic control valve assembly as claimed in Claim 1, incorporating a first one-way valve for controlling communication between said inlet and a second outlet in said housing wherein said first one-way valve is adapted to close when pressure at said second outlet attains at least a predetermined valve which pressure is then operative to urge said valve member away from said seating.

5. An hydraulic control valve assembly as claimed in Claim 4, incorporating a second one-way valve located between said first one-way valve and a third outlet in said housing, wherein said first and second one-way valves are arranged in tandem and said valve member is urged away from said seating by fluid pressure at said outlets.

* * * * *